US008677127B2

(12) United States Patent
Messerschmidt (10) Patent No.: US 8,677,127 B2
(45) Date of Patent: Mar. 18, 2014

(54) METHOD AND APPARATUS FOR SECURE SETUP OF AN ENCRYPTED CONNECTION BETWEEN TWO COMMUNICATION DEVICES

(75) Inventor: André Messerschmidt, Duisburg (DE)

(73) Assignee: Lantiq Deutschland GmbH, Neubiberg (DE)

( * ) Notice: Subject to any disclaimer, the term of this patent is extended or adjusted under 35 U.S.C. 154(b) by 63 days.

(21) Appl. No.: 13/314,715

(22) Filed: Dec. 8, 2011

(65) Prior Publication Data

US 2013/0151844 A1    Jun. 13, 2013

(51) Int. Cl.
*H04L 9/32* (2006.01)
(52) U.S. Cl.
USPC ........................................... 713/171; 713/153
(58) Field of Classification Search
USPC ........................... 713/153, 150, 171; 380/200
See application file for complete search history.

(56) References Cited

U.S. PATENT DOCUMENTS

| 8,250,649 | B2 * | 8/2012 | Gonzalez et al. | 726/19 |
| 8,261,055 | B2 * | 9/2012 | Sakai | 713/150 |
| 2005/0114663 | A1 * | 5/2005 | Cornell et al. | 713/168 |
| 2007/0208930 | A1 * | 9/2007 | Blank et al. | 713/150 |
| 2008/0028203 | A1 * | 1/2008 | Sakai | 713/150 |
| 2008/0144650 | A1 * | 6/2008 | Boch et al. | 370/464 |
| 2008/0260148 | A1 * | 10/2008 | Lee et al. | 380/200 |
| 2009/0228707 | A1 * | 9/2009 | Linsky | 713/171 |
| 2012/0159165 | A1 * | 6/2012 | Schibuk | 713/168 |

* cited by examiner

*Primary Examiner* — Samson Lemma
(74) *Attorney, Agent, or Firm* — Murphy, Bilak & Homiller, PLLC (57) ABSTRACT

An electronic device includes a first connection interface and a second connection interface. The first connection interface is operable to exchange security information with another electronic device for use in encrypting data transmissions with the other electronic device. The first connection interface is inoperable to communicate payload data encrypted using the security information. The second connection interface is different than the first connection interface and operable to securely communicate payload data with the other electronic device over an unsecure medium in accordance with the security information exchanged via the first connection interface.

22 Claims, 9 Drawing Sheets

METHOD AND APPARATUS FOR SECURE SETUP OF AN ENCRYPTED CONNECTION BETWEEN TWO COMMUNICATION DEVICES

FIELD OF TECHNOLOGY

The present application relates to encrypted data transmissions between communication devices, in particular secure setup of such encrypted data transmissions over unsecured media.

BACKGROUND

Home network technology standards such as powerline (e.g. G.hn) provide for the interconnection of household appliances. However, when using unsecured media such as powerline, Ethernet, WiFi, Bluetooth, etc. data transmissions can be readily intercepted by other parties and comprised if unprotected. To ensure privacy is maintained, some form of encryption should be used when transmitting data over an unsecure medium. Full end-to-end encryption is often complicated to setup and maintain. This is especially true for persons without a technical background who tend to underestimate the risks and often do not understand data transmissions may be unsecure. Such security concerns also exist in WLAN (wireless local area network).

Powerline and other types of network accessible electronic devices are conventionally configured using a personal computer and special software which generates a user encryption key for a particular connection. With this approach, a personal computer is needed to make the device operational. Special software also needs to be installed for use in configuring the device. Today more and more personal computers are replaced by smartphones or internet tablets which cannot use personal computer software. Also it is difficult for many end users to understand the need to connect a new device to a personal computer before it can be used. The personal computer based setup process is even more frustrating if the device has no obvious connection to a computer e.g. such as for a coffee machine or a sound system.

Other connection setup variants typically use some form of a WPS (Wi-Fi protected setup) mechanism. In such a case a button at the device is pressed, placing the device in a connection setup mode which allows the exchange of security keys for a certain time frame. Upon successful completion of the connection setup process, the device can operate in a secured mode. With this approach the key exchange is performed over an unsecure medium, and therefore can be intercepted by a hacker. The hacker can use the ill-gotten security keys to implement a so-called 'man-in-the-middle' attack and listen to the transmitted data unbeknownst to the end user.

SUMMARY

A dedicated connection interface is provided for electronic devices. The dedicated connection interface is used to establish a secure connection between two communication devices for exchanging security information such as keys which can be used to encrypt payload data sent over an unsecure medium. The secure connection is implemented between a pair of electronic devices and not used to transmit payload data encrypted using the security information. A separate data connection interface is provided for this purpose.

According to one embodiment of an electronic device, the device comprises first and second connection interfaces. The first connection interface is operable to exchange security information with another electronic device for use in encrypting data transmissions with the other electronic device. The first connection interface is inoperable to communicate payload data encrypted using the security information. The second connection interface is different than the first connection interface and operable to securely communicate payload data with the other electronic device over an unsecure medium in accordance with the security information exchanged via the first connection interface.

According to a further embodiment of the electronic device, the first connection interface is further operable to exchange security information with a third electronic device for use in encrypting data transmissions with the third electronic device. According to this embodiment, the first connection interface is operable to act as a security proxy between the second and third electronic devices so that the second and third electronic devices can exchange security information over a secure connection established with the first electronic device via the first connection interface.

According to an embodiment of a method of securely communicating data, the method comprises exchanging security information between first and second electronic devices for use in encrypting data transmissions between the first and second electronic devices. The security information is exchanged via a first connection interface included in each electronic device which is inoperable to communicate payload data encrypted using the security information. The method further comprises securely communicating payload data over an unsecure medium in accordance with the security information exchanged via the first connection interface. The payload data is securely communicated using a second connection interface included in each electronic device which is different than the first connection interface.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Figure 1:
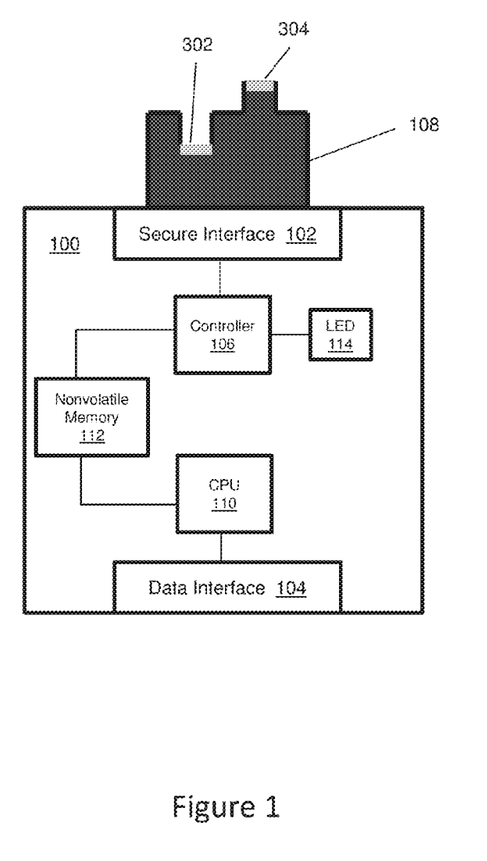
FIG. 1 illustrates an embodiment of an electronic device with a secure connection interface dedicated to exchanging security information with another device.

FIG. 1 illustrates an embodiment of an electronic device 100 which has a secure connection interface 102 and a data connection interface 104. A controller 106 is coupled to the secure connection interface 102 for controlling the exchange of security information such as encryption keys with another electronic device (not shown in FIG. 1) over the secure connection interface 102. The security information exchange process is initiated responsive to a mated connector (not shown in FIG. 1) being received by the secure connection interface 102. In FIG. 1, the secure connection interface 102 includes a connector 108 for receiving the mated connector which may be directly connected to the other device, part of a cable or part of a non-volatile memory as described in more detail later herein.

Figure 2:
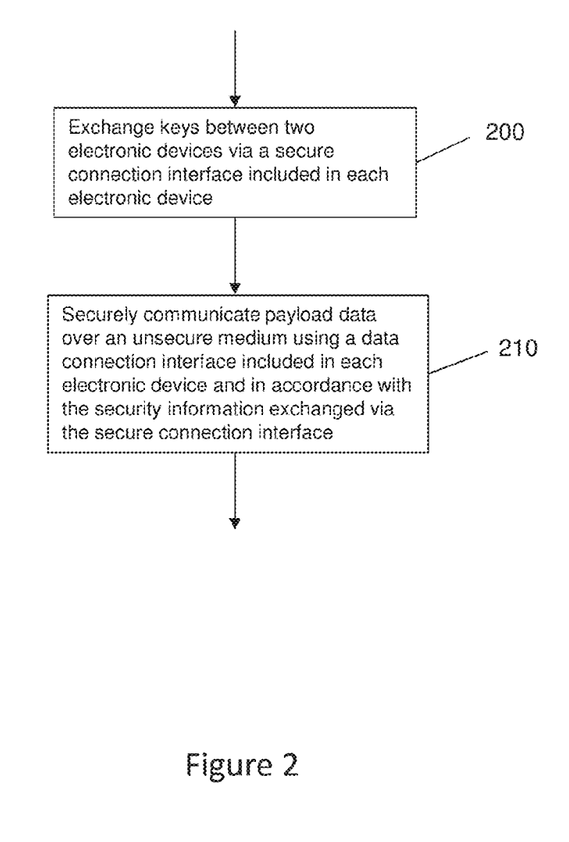
FIG. 2 illustrates an embodiment of a method of securely communicating data.

In each case, security information is exchanged with the other electronic device via the secure connection interface 102 e.g. as illustrated in Step 200 of FIG. 2. The security information is used by a central processor unit (CPU) 110 included in the electronic device 100 for encrypting data transmissions with the other electronic device. The CPU 110 is coupled to the data connection interface 104, and decoupled from the secure connection interface 102 and from the controller 106 according to one embodiment. In another embodiment, the CPU 110 also performs the functions of the controller 106 so that the controller 106 can be excluded. In each case, the CPU 110 securely communicates data with the other electronic device over an unsecure medium such as powerline, Ethernet, WiFi, Bluetooth, etc. via the data connection interface 104 in accordance with the security information exchanged over the secure connection interface 102 e.g. as illustrated in Step 210 of FIG. 2. The secure connection interface 102 is inoperable to communicate the encrypted payload data. The electronic device 100 also includes non-volatile memory 112. The controller 106 stores the security information in the non-volatile memory 112 during the secure connection setup process, and the CPU 110 can subsequently access the non-volatile memory 112 to retrieve the security information independently of the controller 106 to encrypt payload data for transmission over the data connection interface 104.

The secure connection established between the pair of electronic devices via the secure connection interface 102 is an exclusive communication channel which cannot be monitored. The secure connection interface 102 is dedicated to the exchange of security information and not used to transmit payload data encrypted using the security information. Instead, the encrypted data is transmitted using the data connection interface 104 over an unsecure medium. The secure connection interface 102 is designed in a way that both devices can detect a connection and start the exchange of security information. Both devices internally store e.g. respective security keys in the non-volatile memory 112 and use these keys for future communication with each other over an unsecure medium. Each electronic device may include an indicator 114 such as an LED (light emitting diode) for indicating the successful exchange of security information. A pair of electronic devices can be connected together via the secure connection interface 102 in several different ways.

Figure 3:
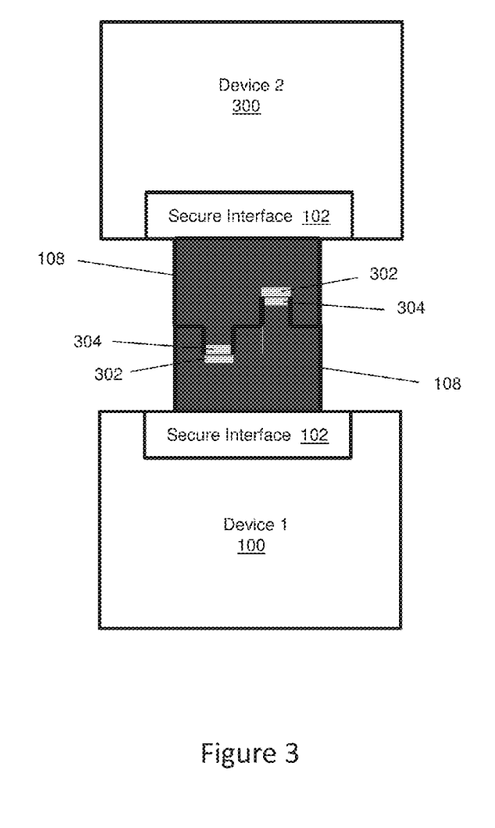
FIG. 3 illustrates an embodiment of two electronic devices directly connected together via respective secure connection interfaces.

FIG. 3 illustrates one embodiment where both devices 100, 300 are directly connected to each other via the secure connection interface 102 by a corresponding mated connector 108. The circuit components of the devices 100, 300 are not shown for ease of illustration, except for the secure connection interface 102 and connectors 108. The secure connection interface 102 is dedicated to establishing a secure connection between the two electronic devices 100, 300. This secure connection is used only by the two devices 100, 300 for exchanging security information such as keys which are then used to encrypt data traffic between the two devices 100, 300 over an unsecure medium. The connectors 108 may be attached, integrated or otherwise form a part of the corresponding secure connection interface 102 as shown in FIGS. 1 and 3. According to this embodiment, each connector 108 has two lines and has the same shape i.e. no male and female connectors. A communication protocol such as I$^2$C could be used over the secure communication interfaces 102 to exchange the security information.

Each connector 108 has a first powered terminal 302 and a second unpowered terminal 304. A voltage is applied at the powered terminal 302 of each connector 108 e.g. by the corresponding controller 106. This voltage is detected at the opposing unpowered terminal 304 at the other device upon connection of the mating terminals. The respective controllers 106 trigger the start of the security information exchange process responsive to detecting the voltage. Of course, current could instead be monitored for the purpose of initiating the security information exchange process.

According to an embodiment of determining which device 100, 300 is master and which device 100, 300 is slave during the exchange of security information, both devices 100, 300 wait for a random amount of time after detecting plug-in of the corresponding mated connector 108 and then each begin sending data as the master after this time period is over. The devices 100, 300 each wait a random amount of time to minimize the likelihood that both devices 100, 300 begin transmitting at the same time. If one device 100, 300 detects activity on the lines during the wait period, this device 100, 300 takes the role of slave for this session and therefore the other device 300, 100 initiates and controls the exchange of security information over its secure connection interface 102.

Figure 4A:
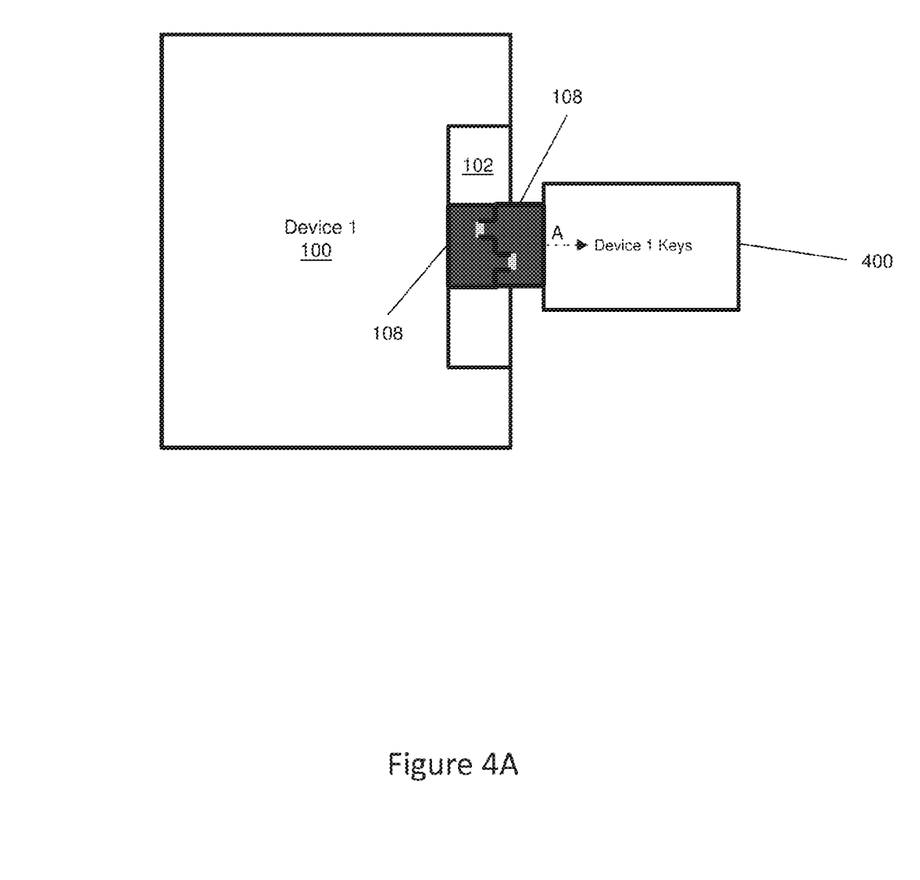
FIGS. 4A to 4C illustrate an embodiment of two electronic devices exchanging security information via a non-volatile memory device having a secure connection interface.
Figure 4B:
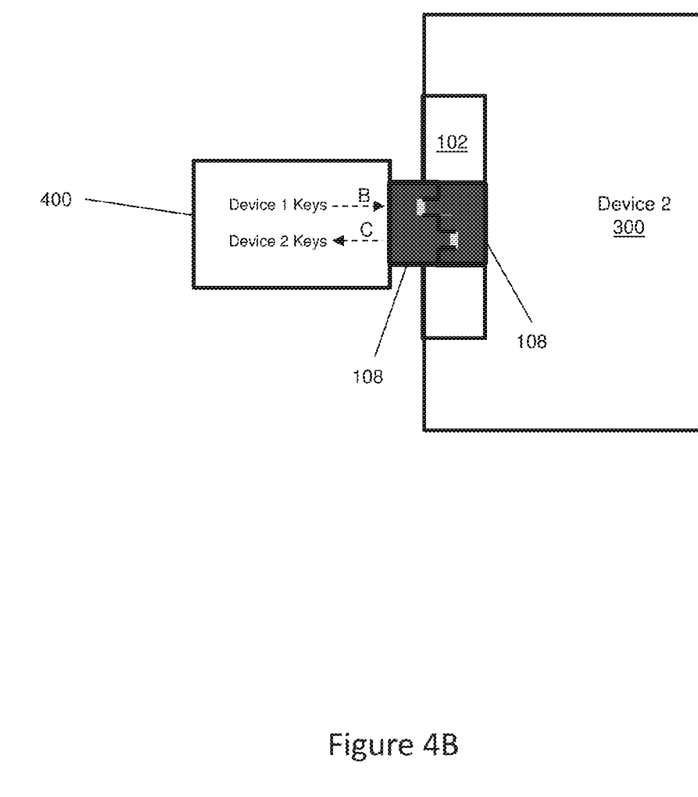
Figure 4C:
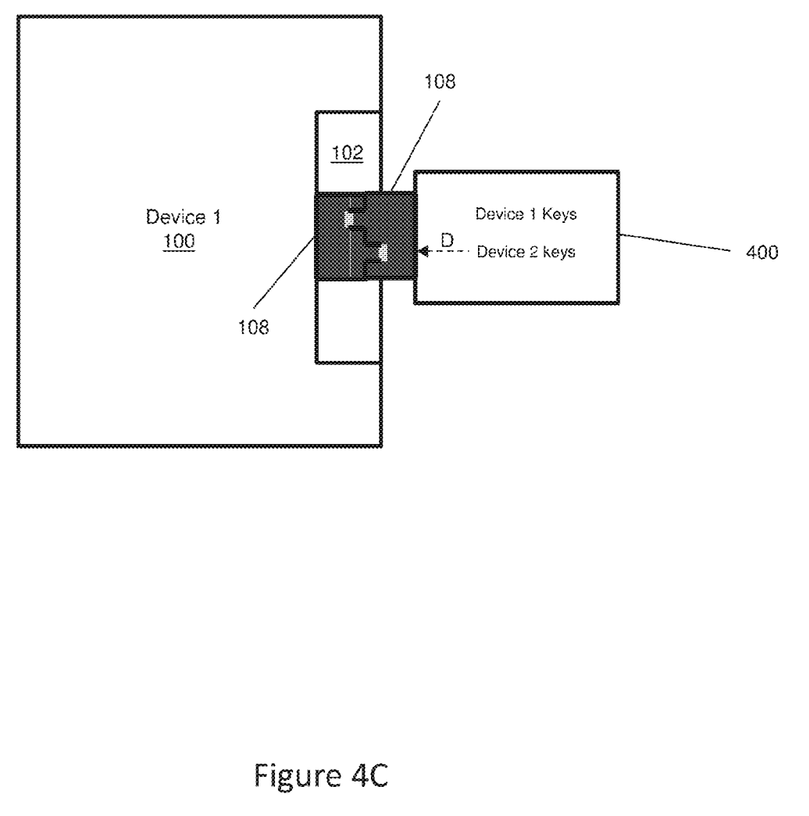

FIGS. 4A-4C illustrate another embodiment where the mated connector 108 plugged into each device 100, 300 is part of an external non-volatile memory device 400 such as a Flash drive which stores one or more security keys associated with the electronic devices 100, 300. The circuit components of the devices 100, 300 are not shown for ease of illustration, except for the secure connection interface 102 and connectors 108. In a first stage (A) of the secure connection process as illustrated in FIG. 4A, the external memory device 400 is plugged into the secure connection interface 102 of a first device 100. In response, the controller 106 of this device 100 generates security information e.g. one or more security keys for the device 100 and transfers the key(s) to the external memory device 400 over the secure connection interface 102. The keys are also stored in the internal memory 112 of the first device 100 for later pairing with keys received from the second device 300.

The next stage of the secure connection process is illustrated in FIG. 4B. The external memory device 400 is removed from the first device 100 and plugged into the secure connection interface 102 of the second device 300. In response, the controller 106 of the second device 300 retrieves (B) the security information for the first device 100 from the external memory 400 and stores the retrieved security information in the non-volatile memory 112 included in the second device 300. The controller 106 also generates security information e.g. one or more security keys for the second device 300 and transfers (C) these key(s) to the external memory device 400 over its secure connection interface 102. At this point, the second device 300 has the necessary key pair for securely communicating with the first device 100.

The following stage (D) of the secure connection process is illustrated in FIG. 4C. The external memory device 400 is removed from the second device 300 and re-inserted into the secure connection interface 102 of the first device 100. Doing so causes the controller 106 of the first device 100 to retrieve the security information for the second device 300 from the external memory 400 and store this information in the non-volatile memory 112 included in the first device 100. Both devices 100, 300 now have the requisite key pair for securely communicating with each other, and the external memory 400 can be removed from the secure connection interface 102 of the first device 100. The two devices 100, 300 can now begin transferring encrypted data over an unsecure medium via the respective data connection interfaces 104 using the exchanged security information as previously described herein. In one embodiment, the external memory device 400 erases the keys which were previously transmitted to the second device 300 responsive to the key being transferred in order to minimize the risk of the keys being compromised in case the memory device 400 is intercepted.

Figure 5:
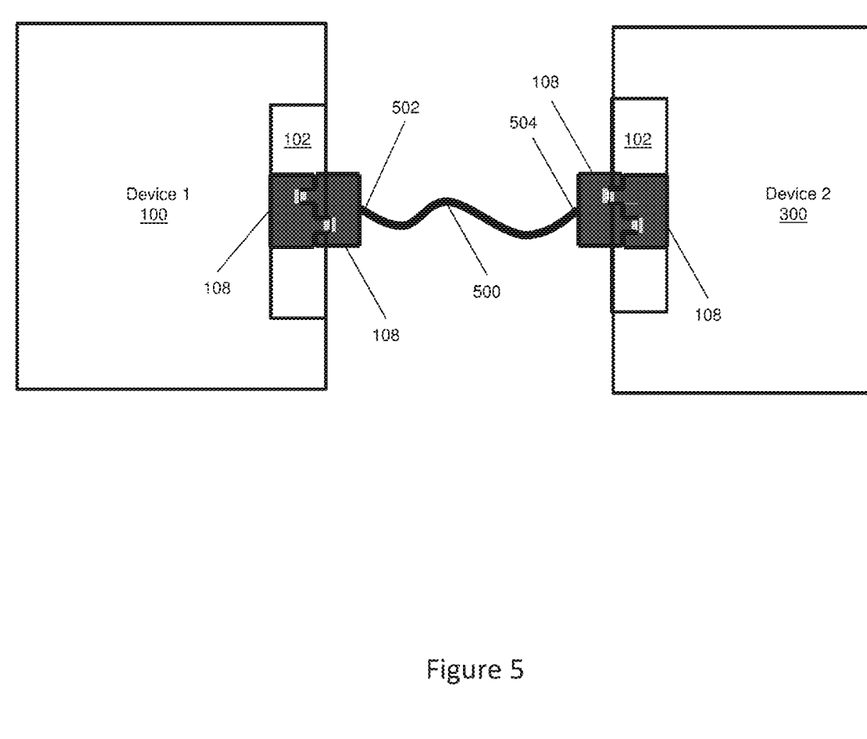
FIG. 5 illustrates an embodiment of two electronic devices connected together via respective secure connection interfaces over a cable.

FIG. 5 illustrates yet another embodiment where the mated connector 108 for insertion into the secure connection interface 102 of each device 100, 300 is disposed at both ends 502, 504 of a cable 500. The circuit components of the devices 100, 300 are not shown for ease of illustration, except for the secure connection interface 102 and connectors 108. The security information exchange process is initiated by plugging one end 502 of the cable 500 into the secure connection interface 102 of the first device 100, and the opposing end 504 of the cable 500 into the secure connection interface 102 of the other device 300. Security information can then be exchanged between the devices 100, 300 as previously described herein. For example, the controllers 106 in each device 100, 300 can detect that a connector 108 has been plugged into the respective secure connection interface 102 and automatically begin the security information transfer process without user interaction.

Figure 6:
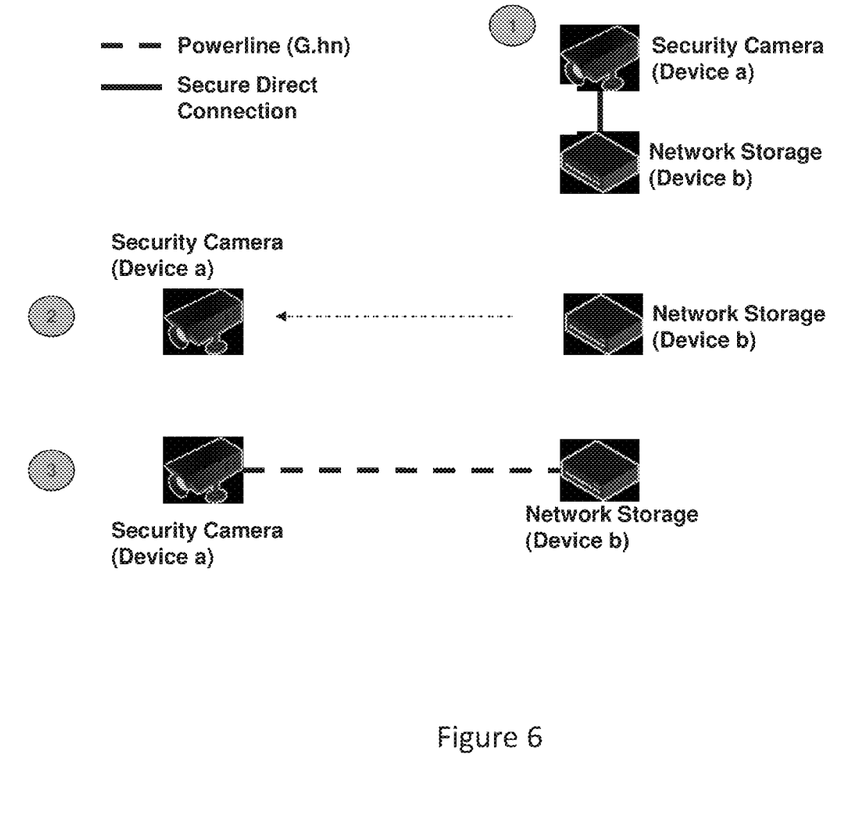
FIG. 6 illustrates an embodiment of a method of securely communicating data between two electronic devices having respective secure connection interfaces.

FIG. 6 illustrates an embodiment of a secure connection setup between a security camera (Device a) and a network storage system (Device b). In a first stage (1), both devices are connected via a dedicated connector 108 (not shown in FIG. 6 for ease of illustration) and exchange keys over a secure direct connection. The secure connection is managed under control of the respective controllers 106 and secure connection interfaces 102 (also not shown in FIG. 6 for ease of illustration) as previously described herein. In a second stage (2), the camera is brought to a new location and connected to the network over an unsecure medium such as powerline. In a third stage (3), a secure connection is established over the unsecure medium between the camera and the network storage using the keys previously exchanged. The camera can now store pictures on the network storage without sending the data unencrypted over the medium. The encrypted data is transmitted under control of the respective CPUs 110 and data connection interfaces 104 (not shown in FIG. 6 for ease of illustration) as previously described herein.

To enable secure communication for devices, each device should have unique keys or other security information for each device it wants to communicate with. This prevents other devices from eavesdropping on the communication. For a small number of devices it may be manageable to connect each pair of device combinations together to exchange security information among the devices, but for many devices which are distributed over a large area this approach is less feasible. To overcome this issue a security proxy can be used as previously described herein. A new device can use the security proxy to establish secure connections to other devices currently unknown to the new device.

The methods described above use end-to-end encryption which implies that all devices in a network need to exchange keys with any other device in the network to be able to communicate in a secure way. For larger networks it can be very time-consuming to add a new device into an already deployed environment, where the new device would need to establish a physical connection to every other device. In such a case a security proxy can be provided having the secure connection interface and the data connection interface described previously herein. The proxy device could establish a secure connection to the new device in the described way.

In one embodiment, during the secure connection setup the proxy device signals its ability to function as a proxy to the new device. Then if the new device is to connect to another (target) device and no security information is stored in the new device for the target device, the proxy device is contacted by the new device to determine whether the proxy device is aware of the target device e.g. whether the proxy has encryption keys for the target device. If so the proxy devices uses its secure connection with the target device to initiate a key exchange for the new device. By using public key algorithms, the key exchange can be handled in a way so that the proxy device does not learn of the secret key pair generated for the new device and target device. Instead the proxy device only forwards secure connection setup messages between the new device and target device. Once keys or other security information is exchanged between the new device and target device via the proxy device, a direct encrypted communication can be established between the new device and target device over an unsecure medium via the respective data connection interfaces as previously described herein. Group keys for broadcast data can also be provided by the proxy device.

Figure 7:
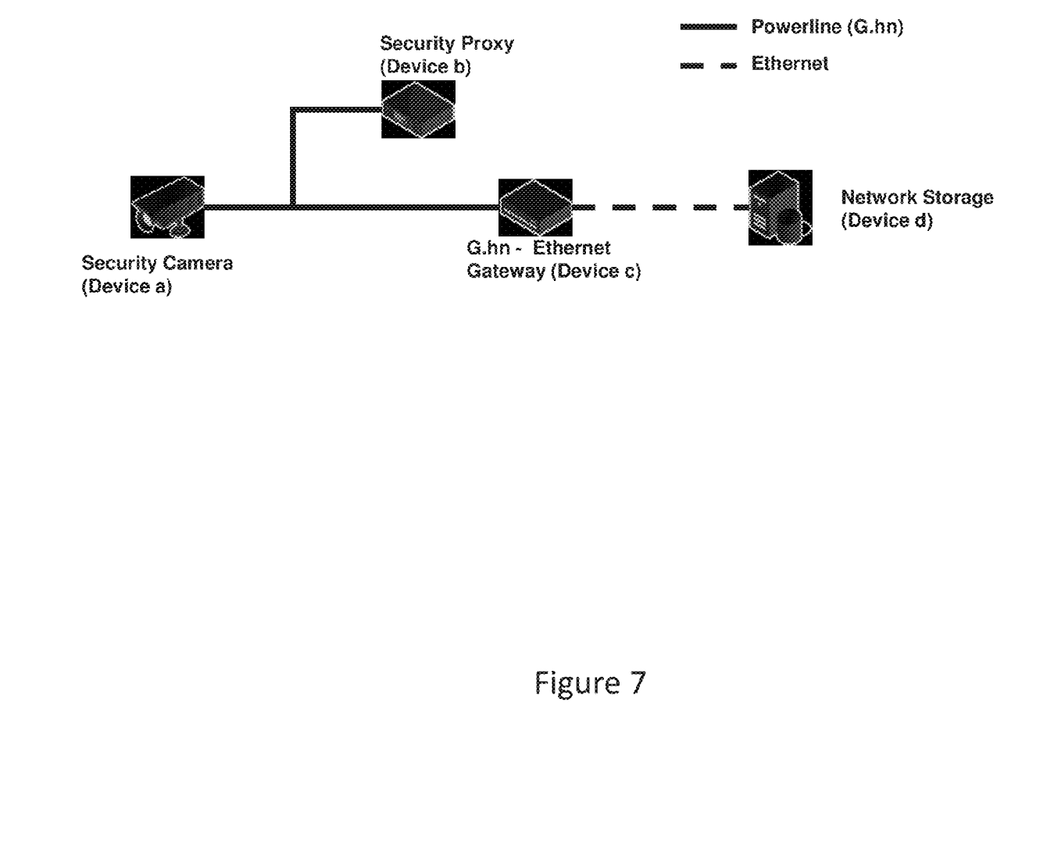
FIG. 7 illustrates an embodiment of a method of securely communicating data via an intermediary security proxy device having a secure connection interface.

FIG. 7 illustrates an embodiment of a security proxy device (Device b) in a distributed network environment. The network includes the security proxy, a camera (Device a), an Ethernet gateway (Device c) and a network storage system (Device d). The camera is newly added to the network and has only exchanged keys or other security information with the security proxy and not the other devices. To communicate encrypted data with the Ethernet gateway, the appropriate keys need to be exchanged between the camera and the gateway. Since the camera cannot establish a direct secure connection with the gateway, the camera sends a query to the security proxy device to determine whether the proxy has keys stored for a secure connection with the gateway.

If such keys are available at the security proxy, the security proxy generates a request for key exchange with the camera and forwards this request over a data connection with the gateway using encryption keys or other security information previously exchanged with the gateway to protect the data contained in the request. The encrypted data connection with the gateway is over an unsecure medium such as powerline, but is secure in that both devices have keys for sending encrypted data to each other. The gateway sends a response to the camera via the security proxy. The message exchange continues between the camera and gateway via the security proxy, with the security proxy handling the complete key exchange. The secure connection setup process between the proxy and each device is managed under control of the respective controllers 106 and secure connection interfaces 102 (not shown in FIG. 7 for ease of illustration) as previously described herein. With public key methods, the security proxy can be prevented from accessing the secret keys exchanged between the camera and gateway.

After exchanging appropriate security information, the camera and gateway can securely communicate directly with each other over the unsecure medium and the camera can access data stored on the network storage system via the gateway. The encrypted data is transmitted under control of the respective CPUs 110 and data connection interfaces 104 (also not shown in FIG. 7 for ease of illustration) as previously described herein. This is just one embodiment of a method for safely exchanging security information between pairs of devices in a distributed network. Other and/or additional types of devices may include the separate secure and data connection interfaces described herein for enabling the safe exchange of security information over a distributed network.

Spatially relative terms such as "under", "below", "lower", "over", "upper" and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An electronic device, comprising:
    a first connection interface operable to exchange security information with another electronic device for use in encrypting data transmissions with the other electronic device, the first connection interface being inoperable to communicate payload data encrypted in accordance with the security information; and
    a second connection interface different than the first connection interface and operable to securely communicate payload data with the other electronic device over an unsecure medium in accordance with the security information exchanged via the first connection interface.

2. The electronic device according to claim 1, further comprising a controller coupled to the first connection interface and operable to permit the exchange of security information with the other electronic device over the first connection interface responsive to a mated connector being received by the first connection interface.

3. The electronic device according to claim 2, wherein the mated connector is part of a non-volatile memory device operable to store one or more security keys associated with the other electronic device.

4. The electronic device according to claim 3, wherein in response to the mated connector being received by the first connection interface, the controller is operable to retrieve the one or more security keys associated with the other electronic device, generate one or more corresponding security keys associated with the electronic device, and store the one or more corresponding security keys on the non-volatile memory.

5. The electronic device according to claim 2, wherein the mated connector is part of a cable for connecting the two electronic devices.

6. The electronic device according to claim 2, wherein the mated connector is part of the other electronic device.

7. The electronic device according to claim 2, further comprising a central processor unit coupled to the second connection interface and decoupled from the first connection interface and from the controller, and wherein the central processor unit is operable to securely communicate data with the other electronic device over the unsecure medium via the second connection interface in accordance with the security information exchanged via the first connection interface.

8. The electronic device according to claim 7, further comprising non-volatile memory, and wherein the controller is operable to store the security information in the non-volatile memory and the central processor unit is operable to access the non-volatile memory to retrieve the security information independently of the controller.

9. The electronic device according to claim 2, wherein the controller is operable to initiate and control the exchange of security information with the other electronic device responsive to a random amount of time lapsing after the mated connector is received by the first connection interface during which no activity is detected from the other electronic device.

10. The electronic device according to claim 1, further comprising an indicator operable to indicate whether the security information was successfully exchanged between the two electronic devices.

11. The electronic device according to claim 1, wherein the first connection interface comprises a connector having a first powered terminal and a second unpowered terminal.

12. An electronic device, comprising:
    a first connection interface operable to exchange security information with a second electronic device for use in encrypting data transmissions with the second electronic device, the first connection interface being inoperable to communicate payload data encrypted using the security information; and
    a second connection interface different than the first connection interface and operable to securely communicate payload data with the second electronic device over an unsecure medium in accordance with the security information exchanged via the first connection interface;
    wherein the first connection interface is further operable to exchange security information with a third electronic device for use in encrypting data transmissions with the third electronic device, and wherein the electronic device is operable to act as a security proxy for enabling the second and third electronic devices to exchange security information via the security proxy.

13. The electronic device according to claim 12, wherein the security proxy is operable to receive security information from the second electronic device for use by the third electronic device in encrypting payload data to the second electronic device, send the security information received from the second electronic device to the third electronic device, receive security information from the third electronic device for use by the second electronic device in encrypting payload data to the third electronic device, and send the security information received from the third electronic device to the second electronic device.

14. A method of securely communicating data, comprising:
    exchanging security information between first and second electronic devices for use in encrypting data transmissions between the first and second electronic devices, the security information exchanged via a first connection interface included in each electronic device which is inoperable to communicate payload data encrypted using the security information; and securely communicating payload data over an unsecure medium in accordance with the security information exchanged via the first connection interface, the payload data securely communicated using a second connection interface included in each electronic device which is different than the first connection interface.

15. The method according to claim 14, further comprising permitting the first electronic device to exchange the security information with the second electronic device over the first connection interface responsive to a mated connector being received by the first connection interface of the first electronic device.

16. The method according to claim 15, wherein the mated connector is part of a non-volatile memory device storing one or more security keys associated with the second electronic device.

17. The method according to claim 16, further comprising:
retrieving the one or more security keys associated with the second electronic device by the first electronic device responsive to the mated connector being received by the first connection interface of the first electronic device;
generating one or more corresponding security keys associated with the first electronic device; and
storing the one or more corresponding security keys on the non-volatile memory via the first connection interface of the first electronic device.

18. The method according to claim 15, further comprising decoupling a central processor unit of each electronic device from the first connection interface of the device.

19. The method according to claim 18, further comprising:
storing the security information in a non-volatile memory in each electronic device; and permitting the central processor unit of each electronic device to access the non-volatile memory for retrieving the security information, independently of a controller included in each electronic device which controls operation of the first connection interface.

20. The method according to claim 15, further comprising initiating and controlling the exchange of security information with the second electronic device by the first electronic device responsive to a random amount of time lapsing after the mated connector is received by the first connection interface of the first electronic device during which no activity is detected from the second electronic device.

21. The method according to claim 14, further comprising:
exchanging security information between the first electronic device and a third electronic device via the first connection interface, for use in encrypting data transmissions between the first and third electronic devices; and
enabling the first electronic device to act as a security proxy between the second and third electronic devices so that the second and third electronic devices can exchange security information via the security proxy.

22. The method according to claim 21, further comprising:
receiving security information at the security proxy from the second electronic device for use by the third electronic device in encrypting payload data to the second electronic device;
sending the security information received from the first electronic device to the third electronic device;
receiving security information at the security proxy from the third electronic device for use by the second electronic device in encrypting payload data to the third electronic device; and
sending the security information received from the third electronic device to the second electronic device.

\* \* \* \* \*